C. KELLER.
FEED STOP FOR LATHES.
APPLICATION FILED OCT. 1, 1918.
1,316,162.
Patented Sept. 16, 1919.
2 SHEETS—SHEET 1.
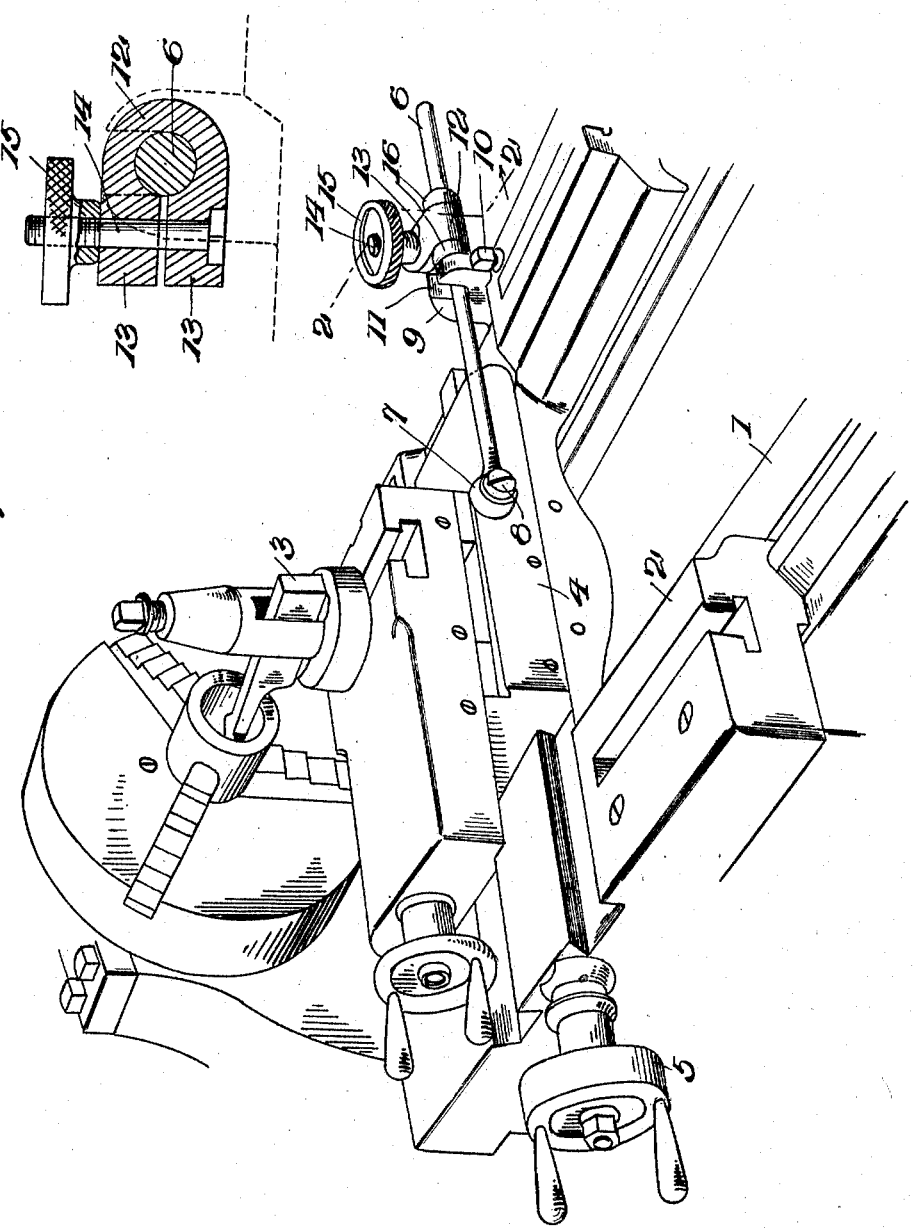
Inventor
Charles Keller.
By
Lacey & Lacey, Attorneys C. KELLER.
FEED STOP FOR LATHES.
APPLICATION FILED OCT. 1, 1918.
1,316,162.
Patented Sept. 16, 1919.
2 SHEETS—SHEET 2.
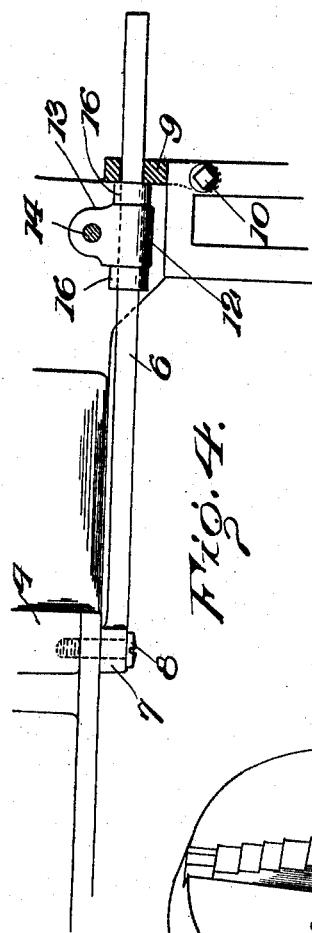
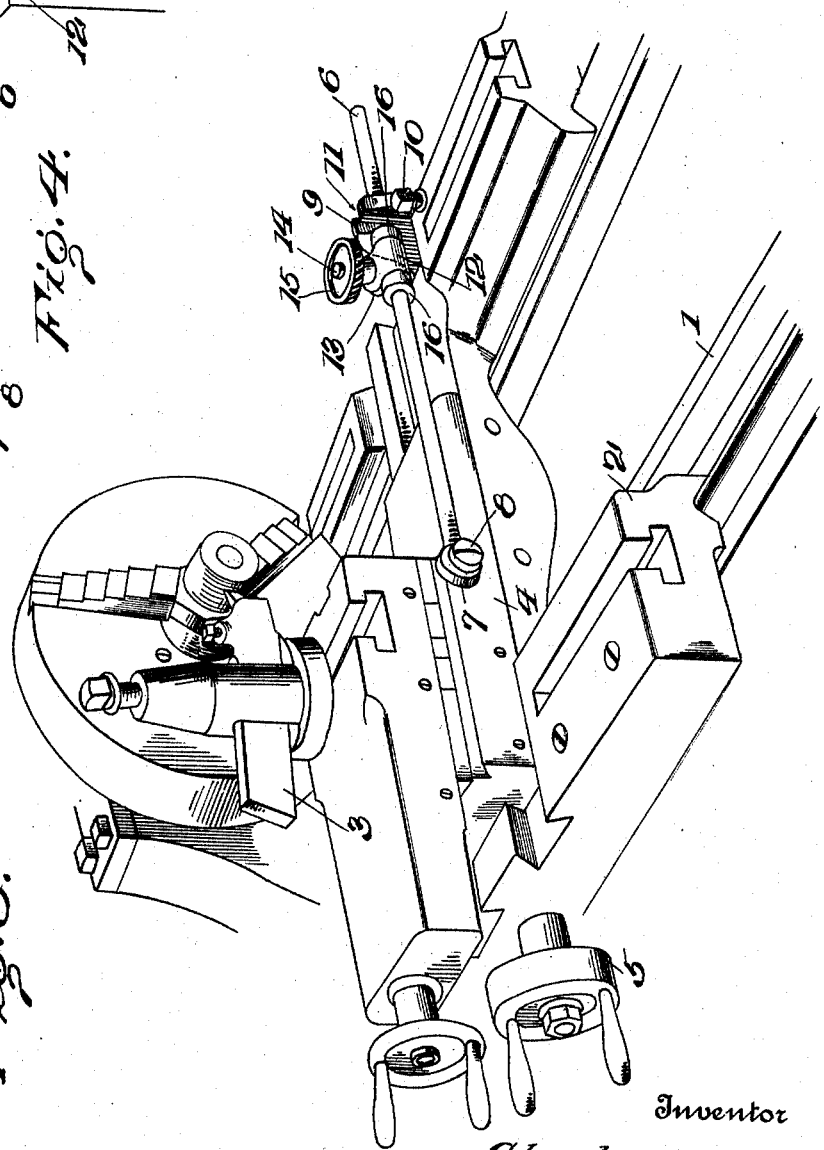
Inventor
Charles Keller.
By
Lacey & Lacey Attorneys

UNITED STATES PATENT OFFICE.

CHARLES KELLER, OF EAU CLAIRE, WISCONSIN.

FEED-STOP FOR LATHES.

1,316,162.   Specification of Letters Patent.   Patented Sept. 16, 1919.

Application filed October 1, 1918. Serial No. 256,487.

*To all whom it may concern:*

Be it known that I, CHARLES KELLER, a citizen of the United States, residing at Eau Claire, in the county of Eau Claire and State of Wisconsin, have invented certain new and useful Improvements in Feed-Stops for Lathes, of which the following is a specification.

The object of this invention is to provide an inexpensive device which may be easily attached to any lathe and by the use of which the cross feed of the cutter or other tool may be accurately controlled.

The invention is illustrated in the accompanying drawings and will be hereinafter fully described, the novel features being subsequently pointed out in the appended claims.

In the drawings—

Figure 1 is a perspective view of my stop device showing it applied to control the feeding of a tool working in the bore of a tube or pipe;

Fig. 2 is an enlarged detail section on the line 2—2 of Fig. 1;

Fig 3 is a view similar to Fig. 1 but showing the device arranged to control the feed of a tool operating exteriorly upon the work;

Fig. 4 is a detail plan view, partly in section of the improved attachment.

The lathe may be of any desired size, form or construction and in itself forms no part of my invention, the accompanying drawings showing a well-known form of lathe comprising a frame 1 and a carriage 2 mounted for longitudinal movement upon the frame. The cutter or other tool 3 is supported upon a transverse carriage 4 which is mounted upon the carriage 2 and is slidable transversely of the same, the said transverse carriage being shifted relative to the main carriage 2 by a worm or feed screw provided at the front of the lathe with a hand wheel or other form of turning member 5.

In carrying out my invention, I employ a stop rod or bar 6 which is provided at one end with an eye 7 adapted to engage over a stud 8 on the feed carriage 4. This stop bar or rod is supported and guided by a bracket or stop plate 9 secured by a screw 10 to the longitudinally moving carriage 2, the drawing showing the stop plate 9 as having a vertical notch 11 in its upper end or edge and the bar or rod 6 resting on the base of said notch. A stop sleeve 12 is fitted upon the stop rod or bar 6 and is adapted to frictionally engage the same, the said sleeve being split and provided with lugs or ears 13 and a bolt 14 being mounted in one of said lugs or ears and having its threaded extremity projecting above the other lug or ear. A nut 15 is mounted upon the bolt 14 and bears upon the upper lug or ear 13 and it will be readily understood that when the said nut is turned home the lugs or ears 13 will be forced together so that the stop sleeve 12 will be frictionally clamped about the stop rod or bar. Buffer rings or collars 16 may be fitted upon the stop bar or rod 6 against the ends of the sleeve 12, as shown.

It is thought the operation of the device will be readily understood. The cross feed carriage 4 is adjusted so that the tool will be set to make the first cut after which the frictional sleeve 12 and the buffers 16 are moved along the stop rod so that one of said buffers will abut firmly against the stop plate 9, after which the nut 15 is turned home so as to clamp the sleeve about the stop rod whereby the engagement of the sleeve or the buffer collar against the stop plate 9 will hold the stop rod 6 and the carriage 4 unless force be applied through the hand wheel 5. The tool will thus be held steady while the first cut is being made. When the cut has been completed the hand wheel 5 will be manipulated so as to back the tool out and away from the work, this movement of the cross feed carriage causing a corresponding movement of the stop sleeve and the parts immediately adjacent thereto so that they will be disengaged from the stop plate. The carriage 4 is then adjusted in the usual manner to set the tool for the second cut and this forward movement of the carriage will be free and easy until the friction sleeve or buffer ring again abuts the stop plate 9, the operator immediately feeling the contact as is obvious. If force be then applied to the hand wheel 5, the stop rod 6 will be drawn through the friction sleeve and as this movement is resisted by the frictional engagement of the sleeve, it will be necessarily slow so that the operator will have ample time to closely observe the adjustment of the cutter or other tool and, consequently, will not be apt to move the same beyond the proper distance.

The attachment may be used in connection with either internally or externally operating tools and in Fig. 1 is shown arranged for use in connection with an internal cutter in which case it abuts against the rear side of the stop plate 9, while in Fig. 3 it is shown in advance of the stop plate and is thereby adapted for use in connection with an external cutter. The device is exceedingly simple and may be produced and applied to any lathe at a trifling cost.

Having thus described my invention, what is claimed as new is:

1. An attachment for lathes comprising a stop plate, a stop rod adapted to be secured to the cross-feed carriage of a lathe and slidably resting upon the stop plate, and a slip stop sleeve adjustably secured upon the stop rod and adapted to impinge against the stop plate.

2. An attachment for lathes comprising a stop plate to be secured to the longitudinally traveling carriage of the lathe, a stop bar to be secured at one end to the cross-feed carriage of the lathe and slide upon the stop plate, a slip sleeve mounted upon the stop rod in position to impinge against said stop plate, and means for frictionally securing said stop sleeve to the stop bar.

3. An attachment for lathes comprising a stop plate having a notch in its upper edge and adapted to be secured to the longitudinal carriage of a lathe, a stop bar pivoted at one end to the cross-feed carriage of the lathe and slidably engaging the notch in the stop plate, a split sleeve fitted upon the stop bar, and means mounted in the members of the split sleeve to frictionally clamp the same upon the stop bar.

4. An attachment for lathes comprising an abutment, a stop-rod movable in the direction of its length upon the abutment, and a slip stop member held frictionally on the stop rod in position to coöperate with the abutment.

In testimony whereof I affix my signature.

CHARLES KELLER. [L. S.]

Copies of this patent may be obtained for five cents each, by addressing the "Commissioner of Patents, Washington, D. C."